United States Patent
Liu et al.

(10) Patent No.: US 7,334,148 B2
(45) Date of Patent: Feb. 19, 2008

(54) OPTIMIZATION OF INTEGRATED CIRCUIT DEVICE I/O BUS TIMING

(75) Inventors: Jonathan H. Liu, Folsom, CA (US); Hing Y. To, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 411 days.

(21) Appl. No.: 10/761,604

(22) Filed: Jan. 20, 2004

(65) Prior Publication Data
US 2004/0153684 A1    Aug. 5, 2004

Related U.S. Application Data

(63) Continuation of application No. 09/608,343, filed on Jun. 29, 2000, now Pat. No. 6,725,390.

(51) Int. Cl.
*H03M 13/00* (2006.01)
(52) U.S. Cl. ................ 713/401; 713/400; 713/500; 713/501; 713/502; 713/503; 713/600; 713/601
(58) Field of Classification Search ........ 713/400–401, 713/500–503, 600–601
See application file for complete search history.

(56) References Cited

U.S. PATENT DOCUMENTS

| | | | |
|---|---|---|---|
| 4,677,394 A | | 6/1987 | Vollmer |
| 5,313,501 A | | 5/1994 | Thacker |
| 5,355,037 A | | 10/1994 | Andresen et al. |
| 5,513,377 A | * | 4/1996 | Capowski et al. ......... 710/61 |
| 5,577,078 A | * | 11/1996 | Jordan et al. ............ 375/371 |
| 5,604,775 A | | 2/1997 | Saitoh et al. |
| 5,790,612 A | | 8/1998 | Chengson et al. |
| 5,794,020 A | * | 8/1998 | Tanaka et al. ............ 713/401 |
| 5,828,857 A | | 10/1998 | Scalise |
| 5,872,959 A | | 2/1999 | Nguyen et al. |
| 5,894,570 A | | 4/1999 | Barkey et al. |
| 5,910,740 A | | 6/1999 | Underwood |
| 6,052,423 A | * | 4/2000 | Blois et al. ............. 375/355 |

(Continued)

FOREIGN PATENT DOCUMENTS

JP        406069989        3/1994

(Continued)

OTHER PUBLICATIONS

Hideo Kuwahara et al., "Phase Aligned Passive Bus (PAB) Scheme for ISDN User-Network Interface," IEEE Journal, vol. Sac-4, No. 8, Nov. 1986, pp. 1367-1372.

(Continued)

*Primary Examiner*—A. Elamin
(74) *Attorney, Agent, or Firm*—Blakely, Sokoloff, Taylor & Zafman LLP

(57) ABSTRACT

The invention includes a method to adjust integrated circuit device I/O bus timing. In one embodiment, the method includes comparing an alignment between an edge of a first clock signal to a center of a data packet to produce an alignment offset signal and adjusting the first clock signal using a variable delay device in response to the alignment offset signal to substantially align the edge of the first clock signal to the center of the data packet. Other embodiments are claimed and described.

9 Claims, 7 Drawing Sheets

U.S. PATENT DOCUMENTS

| | | |
|---|---|---|
| 6,105,144 A | 8/2000 | Wu |
| 6,122,335 A * | 9/2000 | Colella et al. ............... 375/355 |
| 6,157,690 A | 12/2000 | Yoneda |
| 6,177,844 B1 | 1/2001 | Sung et al. |
| 6,178,123 B1 | 1/2001 | Kato et al. |
| 6,262,998 B1 | 7/2001 | Hogeboom |
| 6,282,592 B1 | 8/2001 | Aston et al. |
| 6,332,010 B1 | 12/2001 | Lee |
| 6,493,829 B1 | 12/2002 | Kubo |
| 6,725,390 B1 * | 4/2004 | Liu et al. .................... 713/401 |
| 6,735,732 B2 * | 5/2004 | Yamada ...................... 714/744 |
| 6,895,062 B1 * | 5/2005 | Wilson ....................... 375/355 |
| 6,931,086 B2 * | 8/2005 | Harrison .................... 375/374 |
| 6,952,462 B2 * | 10/2005 | Harrison .................... 375/373 |
| 7,016,451 B2 * | 3/2006 | Harrison .................... 375/374 |
| 2002/0153936 A1 * | 10/2002 | Zerbe ......................... 327/336 |
| 2005/0204245 A1 * | 9/2005 | Lee et al. ................... 714/744 |

FOREIGN PATENT DOCUMENTS

| | | |
|---|---|---|
| JP | 411120504 A | 4/1999 |
| WO | PCT 99/61971 | 12/1999 |

OTHER PUBLICATIONS

Alex Waizman, "A Delay Line Loop for Frequency Synthesis of De-Skewed Clock," Feb. 1994, pp. 298-299.

F. Ware, "Direct RAC Data Sheet", Rambus, Aug. 7, 1998, DL0064-00.7, 46 pages.

Rambus Technology Overview, DL0040-00, Aug. 23, 1999, 13 pages.

* cited by examiner

US 7,334,148 B2

OPTIMIZATION OF INTEGRATED CIRCUIT DEVICE I/O BUS TIMING

This Application is a Continuation of the prior application for "OPTIMIZATION OF INTEGRATED CIRCUIT DEVICE I/O BUS TIMING" filed by Jonathan H. Liu and Hing Y. To on Jun. 29, 2000 (U.S. patent application Ser. No. 09/608,343, now U.S. Pat. No. 6,725,390.

FIELD

Embodiments of the invention may include signal alignment among active electrical devices, circuits, and systems. More particularly, embodiments of the invention may include employing a transmitted data signal as a clock signal to align this clock signal in a receive device with the incoming data signal.

BACKGROUND

A computer may be thought of as a machine that may be programmed to manipulate symbols. Computers may perform complex and repetitive procedures quickly, precisely and reliably and may quickly store and retrieve large amounts of data. The physical devices (or components) from which a computer may be constructed (electronic circuit devices and input/output devices) are known as "hardware". Most computers have four types of hardware devices: central processing unit (CPU), input, output, and memory. The CPU executes programs ("software") that tell the computer what to do. Input and output (I/O) devices allow the computer to communicate internally among devices and externally with a computer user or other computers. Memory devices may be used to hold intermediate results or to hold programs, application instructions, and database field information.

The last century has seen increasingly complicated networks of machines and systems-satellites, Internet nodes, electrical grids, landline and cell-based phone communications. For those networks to carry out coordinated actions, each needs to agree on the time as they communicate with one another. In order to share information, a computer or a network of computers needs to know when to speak, when to respond, and at what rate to do so. In this sense, the amount of information a computer or a network may distribute is directly related to how fast that information may be transmitted and how accurately time may be synchronized within the computer or across a network.

Intermediate results, programs, application instructions, and field information from database records may be distributed within a computer system as data signals in the form of ones and zeros. To send two data signals along parallel buses to a first and second data port in receive device, for example, a transmit timing signal (or "clock") conventionally is sent to a clock recovery device associated with the receive device in advance of the data signals, such as at initialization. This transmit timing signal may be transmitted in the form of a wave having a series of voltage changes that are identified as edges.

On receiving the timing signal, the receive device splits the transmit timing signal into a first timing signal and a second timing signal. These two timing signals are then each routed through a clock buffer, one for each data signal, to the first and second data ports. Each clock buffer uniquely shifts the edges of its own timing signal to account for timing skews that affect the travel speed of its associated timing signal. Timing skews accounted for by a clock buffer may result from variations in the materials used to manufacture one computer to the next, manufacturing tolerance and techniques, and variations in voltages and temperatures as the computer operates over time.

The conventional goal in the above example may be to align the edge of the first timing signal to the center of the first data packet and align an edge of the second timing signal to the center of the second data packet. The problem with this approach may be that the first timing signal edge and the second timing signal edge originate from the same source, namely an edge of the transmit timing signal. Since the receive device splits the transmit timing signal into a first timing signal and a second timing signal, the above approach may be the equivalent of trying to align the one waveform edge of the transmit timing signal to two different data packet centers. Even if this one edge was aligned with the center of the first data packet, timing skews introduced into the second data packet by the transmit device and by the bus over which that data signal travels will most likely result in an undesirable misalignment between the waveform edge and the center of the second data packet.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
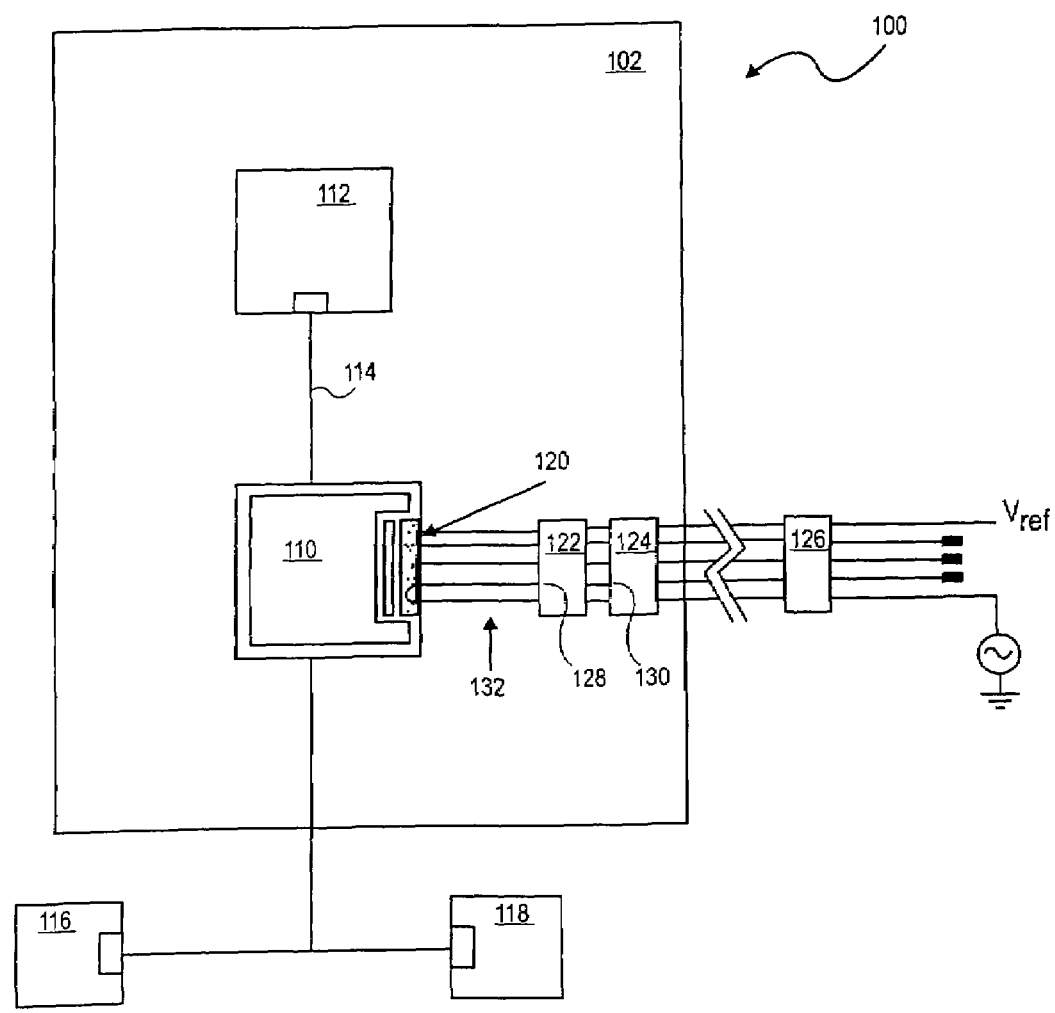
FIG. 1 is a block diagram of platform 100 of the invention.

FIG. 1 is a block diagram of platform 100 of the invention. Platform 100 may be associated with any communication system. For example, platform 100 may be associated with a desk top computer, a main frame, a radio, a television, a mobile computer, such as a laptop, a satellite system, or other electronic device that processes information.

Platform 100 may include motherboard 102. Motherboard 102 may be the main board of a computer. Moreover, motherboard 102 may contain circuitry for a central processing unit, a keyboard, and a monitor as well as include slots to accept additional circuitry. Included with motherboard 102 may be chipset 110 and central processing unit (CPU) 112. Chipset 110 may be coupled to CPU 112 through front side bus (FSB) 114 so as to serve as an interface between CPU 112 and other devices. Chipset 110 may be a collection of integrated circuits designed to be used together as a core logic for some specific purpose, such as control circuitry in a personal computer. CPU 112 may be that part of platform 100 which controls all the other parts by executing software instructions.

Coupled to chipset 110 may be video card 116 and hard drive 118. Video card 116 may be a circuit board having the necessary video memory and other electronics to provide a bitmap display to a monitor. Hard drive 118 may be a disk drive used to read and write one or more rigid magnetic data storage disks (hard disks) that rotate about a central axle.

Chipset 110 may also include first interface 120. First interface 120 may be a cell that serves to send and receive data between the core logic of chipset 110 and one or more devices. These devices may be chip 122, chip 124, and chip 126. Each chip 122, 124, and 126 may include its own input/output cell interface. For example, chip 122 may include second interface 128 whereas chip 124 may include third interface 130. In one embodiment, at least one of chip 122, 124, and 126 may be a dynamic random access memory (DRAM). Each chip may be coupled to chipset 110 through bus 132. Bus 132 may include a set of conductors (such as wires or printed circuit board tracks) that communicatively connect input/output (I/O) interfaces.

Figure 2:
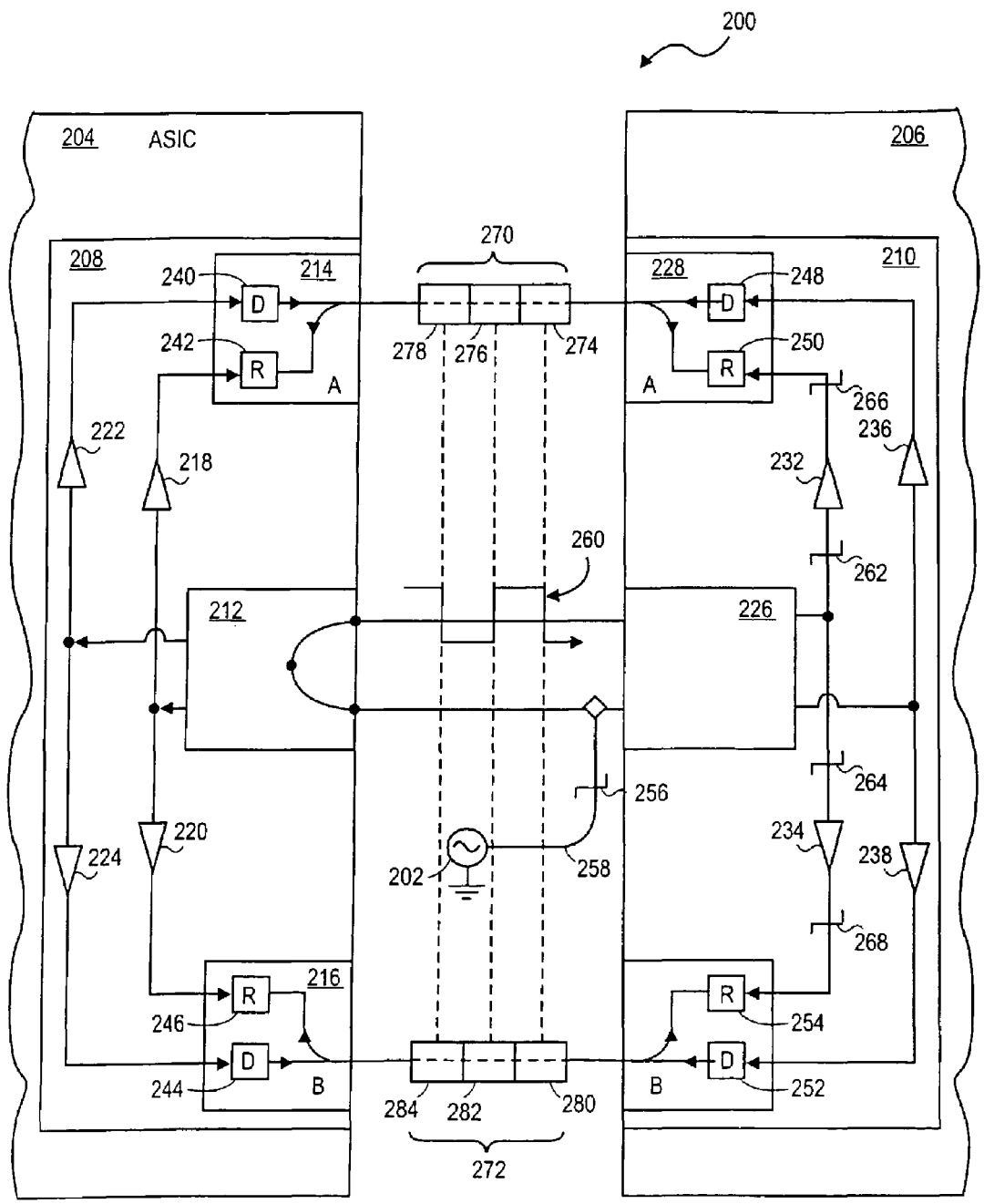
FIG. 2 illustrates conventional platform 200 having clock signal generator 202, ASIC 204, and RDRAM 206.

In a conventional platform, such as seen in FIG. 2, the I/O interface of a chipset may be a Direct Rambus® Application-Specific Integrated Circuit Cell (Direct "Rambus® ASIC Cell" or direct/master "RAC"). The bus may be a direct Rambus® Channel (R-Channel). Coupled to the R-Channel may be I/O interfaces of each of a series of Rambus® dynamic random access memory (Rambus® DRAM or RDRAM). These interfaces may be thought of as slave RACs since each slave RAC may only write to and read from the master RAC whereas the master RAC may write to and read from all the slave RACs on the channel.

FIG. 2 illustrates conventional platform 200 having clock signal generator 202, ASIC 204, and RDRAM 206. Included with ASIC 204 may be master cell 208 and included with RDRAM 206 may be slave cell 210. Clock signal generator 202 generates a timing signal that may be employed by master cell 208 and slave cell 210 execute instructions to send and receive data.

Conventionally, master cell 208 and slave cell 210 include similar components: at least one data input/output devices (A, B, etc.), a clock recovery device, and clock buffers. As seen in FIG. 2, master cell 208 includes master clock recovery device 212, master I/O data port A 214, master I/O data port B 216, and clock buffers 218, 220, 222, and 224. Similarly, slave cell 210 includes slave clock recovery device 226, slave I/O data port A 228, slave I/O data port B 230, and clock buffers 232, 234, 236, and 238. Each I/O data port includes a driver ("D") (240, 244, 248, 252) to transmit data signals and a receiver ("R") (242, 246, 250, 254) to receive data signals.

At start up and over the operation of platform 200, clock signal generator 202 transmits timing signal 256 over bus 258 to each clock recovery device coupled to bus 258. Timing signal 256 may define a waveform having a series of equally spaced edges. The collective of the busses between master cell 208 and slave cell 210 may be thought of as a source synchronous bus—a bus that contributes in synchronizing one or more signals based on a common clock.

As each clock recovery device receives timing signal 256, it redirects this signal to other clock recovery devices to which it may be coupled. This readies its communication partner to receive transmitted data signals. For example, master clock recovery device 212 continuously transmits timing signal 260 to slave clock recovery device 226 as master clock recovery device 212 receives timing signal 256 from clock signal generator 202. This readies slave cell 210 to receive transmitted data signals from master cell 208 as follows.

On receiving timing signal 260 from master clock recovery device 212, slave cell 210 splits timing signal 260 into timing signal 262 and timing signal 264. Timing signal 262 may be routed through clock buffer 232 and timing signal 264 may be routed through clock buffer 234. Each clock buffer uniquely shifts the edges of its own timing signal to account for timing skews that affect the travel speed of other timing signals. For example, clock buffer 232 shifts timing signal 262 to produce timing signal 266 and clock buffer 234 shifts timing signal 264 to produce timing signal 268. The phase of timing signal 266, timing signal 268, and timing signal 260 may be different. Each of timing signal 266 and timing signal 268 may be directed into a different receiver as shown in FIG. 2. Accordingly, an edge of each timing signal 266 and 268 may be ready to align itself to the center of a received (sampled) data packet.

In operation ASIC 204 may send data signals 270 and 272 to RDRAM 206 by activating drivers 240 and 242, respectively. Each driver sends out a data signal. Although the action of each driver may be intended to be synchronized with the other drivers in a cell, differences in the devices or environment may impart differences in the actions of each driver such that the initial transmission of one data signal lags behind the transmission of another data signal. Moreover, the buses over which data signal travel may further impart timing skews. As shown in FIG. 2, data signal 270 lags behind data signal 272 due to transmit device and data bus timing skews.

Data signal 270 may have data packet 274, 276, and 278 and data signal 272 may have data packet 280, 282, and 284. A typical length of a data packet may be 1.25 nanoseconds ($10^{-9}$ seconds or "ns"). As each data packet 274 and 280 enters its associated receiver, a timing signal edge may be designed to be aligned to the center of the data packet. Since RDRAM 206 produced timing signal 266 and 268 from timing signal 260, this alignment step may be the equivalent of aligning one edge of timing signal 260 to the center of data packet 274 as well as aligning one edge of timing signal 260 to the center of data packet 280. However, because data signal 270 lags behind data signal 272 due to the transmit device and data bus timing skews, it may be likely that one if not both centers will not be aligned to a waveform edge.

The invention overcomes this problem by at least working to eliminate the transmit device timing skew and data bus timing skew.

Figures 3, 3A:
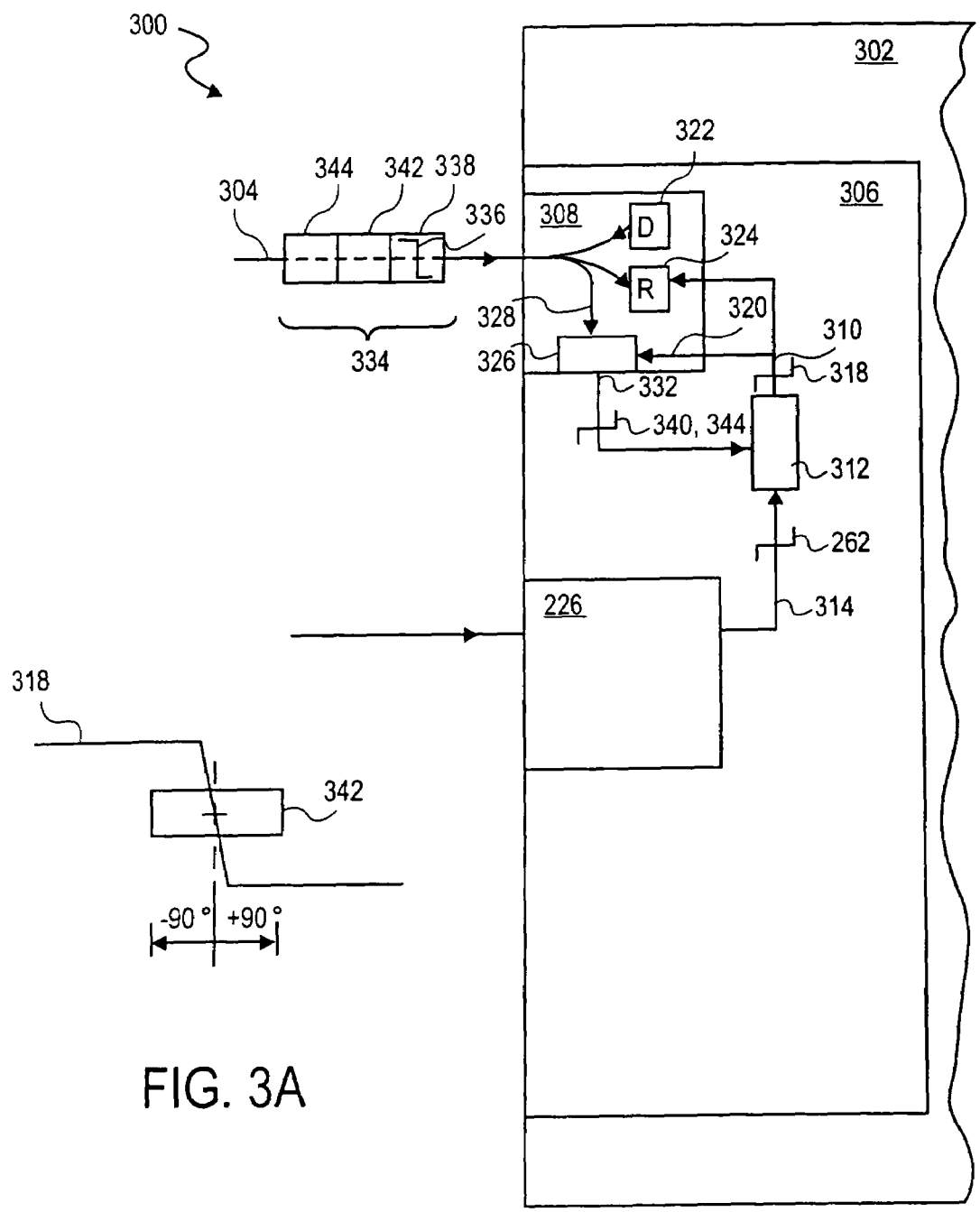
FIG. 3 illustrates platform 300 of the invention.
FIG. 3A illustrates a quadrature alignment between cell clock signal 318 and data packet 342.

FIG. 3 illustrates platform 300 of the invention. Platform 300 may include device 302 and data bus 304. Device 302 may serve as part of an input/output port for one chip, such as an integrated circuit chip. This chip may be an RDRAM, a channel repeater, a memory repeater (or transmit) hub, or a plurality of chips.

Data bus 304 may be a set of conductors, such as wires, copper cable, fiber optics, printed circuit tracks, or connections in an integrated circuit. Data bus 304 also may be that part of a network where there is no physical connection between a sender and a receiver. For example, data bus 304 may be part of a wireless device that connects the sender and receiver through radio or light waves such as where device 302 resides within a satellite where data bus 304 originates on earth. The network may be at least one of a local area network (LAN), a metropolitan area network (MAN), a wide area network (WAN), or the Internet.

Device 302 may include cell 306. As seen in FIG. 3, cell 306 may include data port (or slot) 308, bus 310, variable delay device 312, and bus 314. Data port 308 may be coupled to data bus 304 so as to receive and send data signals along data bus 304. As a variable device, variable delay device 312 may receive raw clock signal 262 from bus 314 as an input and alter raw clock signal 262 to generate cell clock signal 318 on bus 310. Raw clock signal 262 may be generated by a clock signal generator that may be either external or internal to device 302. In one embodiment, raw clock signal 262 may be generated by clock signal generator 202. In another embodiment, raw clock signal 262 may be modified by clock recovery circuit 226. Clock recovery circuit 226 may be a phase locked loop (PLL) or a delay locked loop (DLL). Each clock signal may define a waveform having a plurality of edges.

In one embodiment, variable delay device 312 may be a variable delay line. The delay of variable delay device 312 itself may be varied by controls other than an offset (such as offset 340 or 344 of FIG. 3). For example, the delay of variable delay device 312 itself may be varied manually by a potentiometer.

Associated with data port 308 may be driver ("D") 322, receiver ("R") 324, and detector 326. Driver 322 may be coupled to data bus 304 to transmit data signals from device 302. Receiver 324 may be coupled to data bus 304 to receive data signals on behalf of device 302.

Detector 326 may be a device that receives two inputs, compares their offset from one another, and generate a signal in response to that offset. Detector 326 may include first input 328, second input 330, and output 332. First input 328 may be coupled to data bus 304 to receive data signal 334 as a first input. Second input 330 may be coupled to variable delay device 312 so as to receive cell clock signal 318 as a second input to detector 326. Output 332 of detector 326 may be coupled to variable delay device 312 as an input.

In one embodiment, detector 326 may be a quadrature phase detector (QPD). A quadrature phase detector may be viewed as a state machine that may be used to adjust the output of a buffer device, such as the output of variable delay device 312. In this sense, a quadrature phase detector may be any detector that detects the phase of at least two inputs so as to determine whether they are in quadrature.

In situations where data bus 304 is long, the down pulse width of a transmitted data signal tends to decrease due to attenuation as the data signal travels over the long data bus. This attenuation decrease may be viewed as a duty cycle error. To minimize this incoming data signal skew between an up pulse and a down pulse, detector 326 may vary an input reference voltage (such as reference voltage 714 of FIG. 7).

Figure 4:
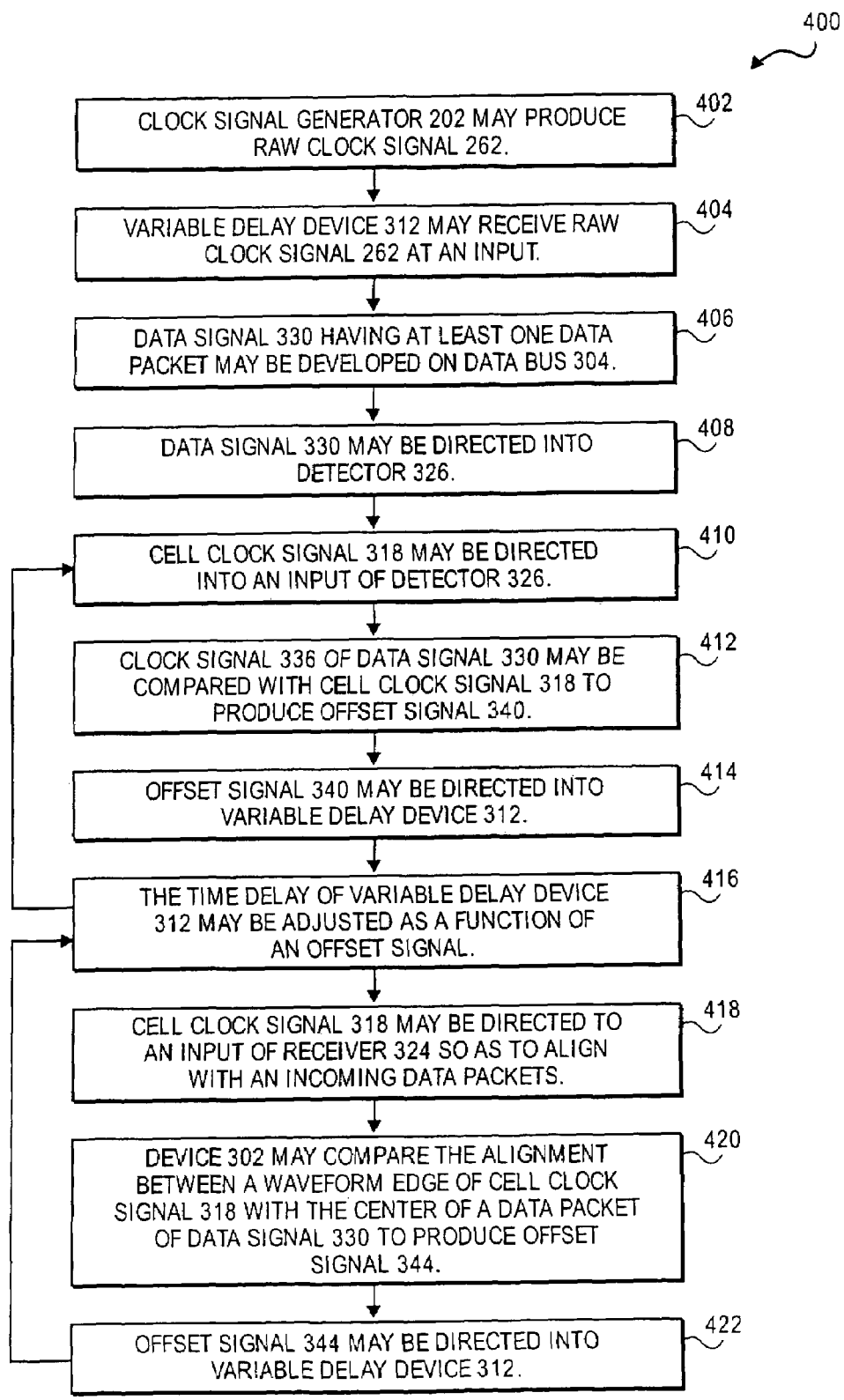
FIG. 4 illustrates method 400 of platform 300.

FIG. 4 illustrates method 400 of platform 300. At step 402, clock signal generator 202 may produce raw clock signal 262. Raw clock signal 262 may define a waveform having a plurality of edges. At step 404, variable delay device 312 may receive raw clock signal 262 at an input. At step 406, data signal 330 having at least one data packet may be developed on data bus 304. This may be achieved by another device (such as chipset 110 of FIG. 1 or ASIC 204 of FIG. 2) placing a data signal onto data bus 304. Each data packet may have a pre-established length, such as 1.25 nanoseconds (ns), where the length of each data packet may be the same, different, or a combination thereof.

The at least one data packet may define a clock signal. This clock signal may be disposed in a lead data packet, such as clock signal 336 disposed in data packet 338 of FIG. 3. Data pulses associated with the lead data packets initially may be in a data pattern so as to give a clock pulse appearance to these data pulses as carried on data bus 304. This data pattern may be a repeating data pattern or a previously agreed upon data pattern. For example, the repeating data pattern may be 010101 . . . , 0011001100 . . . , or 101010 . . . .

At step 408, data signal 330 may be directed into detector 326. Data signal 330 also may be directed into receiver 324. At step 410, cell clock signal 318 may be directed into an input of detector 326. Cell clock signal 318 also may be directed into an input of receiver 324.

At step 412, clock signal 336 of data signal 330 may be compared with cell clock signal 318 to produce offset signal 340. Offset signal 340 may be a signal that represents the relationship between a waveform edge of cell clock signal 318 and a waveform edge of clock signal 336. This relationship may be a phase relationship.

At step 414, offset signal 340 may be directed into variable delay device 312. At step 416, the time delay of variable delay device 312 may be adjusted as a function of an offset signal, such as offset signal 340. For example, the offset signal may indicate that raw clock signal 262 is leading clock signal 336. Accordingly, variable delay device 312 may slow raw clock signal 262 passage through variable delay device 312 as a function of offset signal 340. This may produce a modified cell clock signal 318 whose waveform edges are more inline with the waveform edges of clock signal 336 of data signal 334. Where detector 326 indicates that the signal on bus 328 and bus 330 are in quadrature, the calibration process of method 400 may proceed to other steps. In quadrature, the time delay of variable delay device 312 may be maintained.

At step 418, cell clock signal 318 may be directed to an input of receiver 324 so as to align with an incoming data packets. Where a waveform edge of cell clock signal 318 aligns with the center or midpoint length of a data packet, the alignment may be said to be in quadrature whose phase is +/−90 degrees. FIG. 3A illustrates a quadrature alignment between cell clock signal 318 and data packet 342. Where an edge of cell clock signal 318 is placed at the midpoint of an incoming data pulse (such as that associated with data packet 342), both a setup margin and a hold margin may be maximized.

Method 400 may be performed once at initialization so as to ready device 302 to receive data signals. Moreover, method 400 may be performed as a sequential series one or more times during operation of device 302 as a feedback loop. Accordingly, method 400 may return from step 416 to step 410.

If a waveform edge of cell clock signal 318 is not aligned with the center of a data packet, this information may be used to generate an offset signal to the delay of variable delay device 312. This may permit cell clock signal 318 to align with clock signal 336 in quadrature. Accordingly, at step 420, device 302 may compare the alignment between a waveform edge of cell clock signal 318 with the center of a data packet of data signal 330 to produce offset signal 344. Offset signal 344 may be thought of as an alignment offset signal. At step 422, offset signal 344 may be directed into variable delay device 312. This may be achieved by porting offset signal 344 to output 332 of detector 326. Method 400 then may return from step 422 to step 416. Here, method 400 may be performed as a sequential series one or more times during operation of device 302 as a feedback loop.

Figure 5:
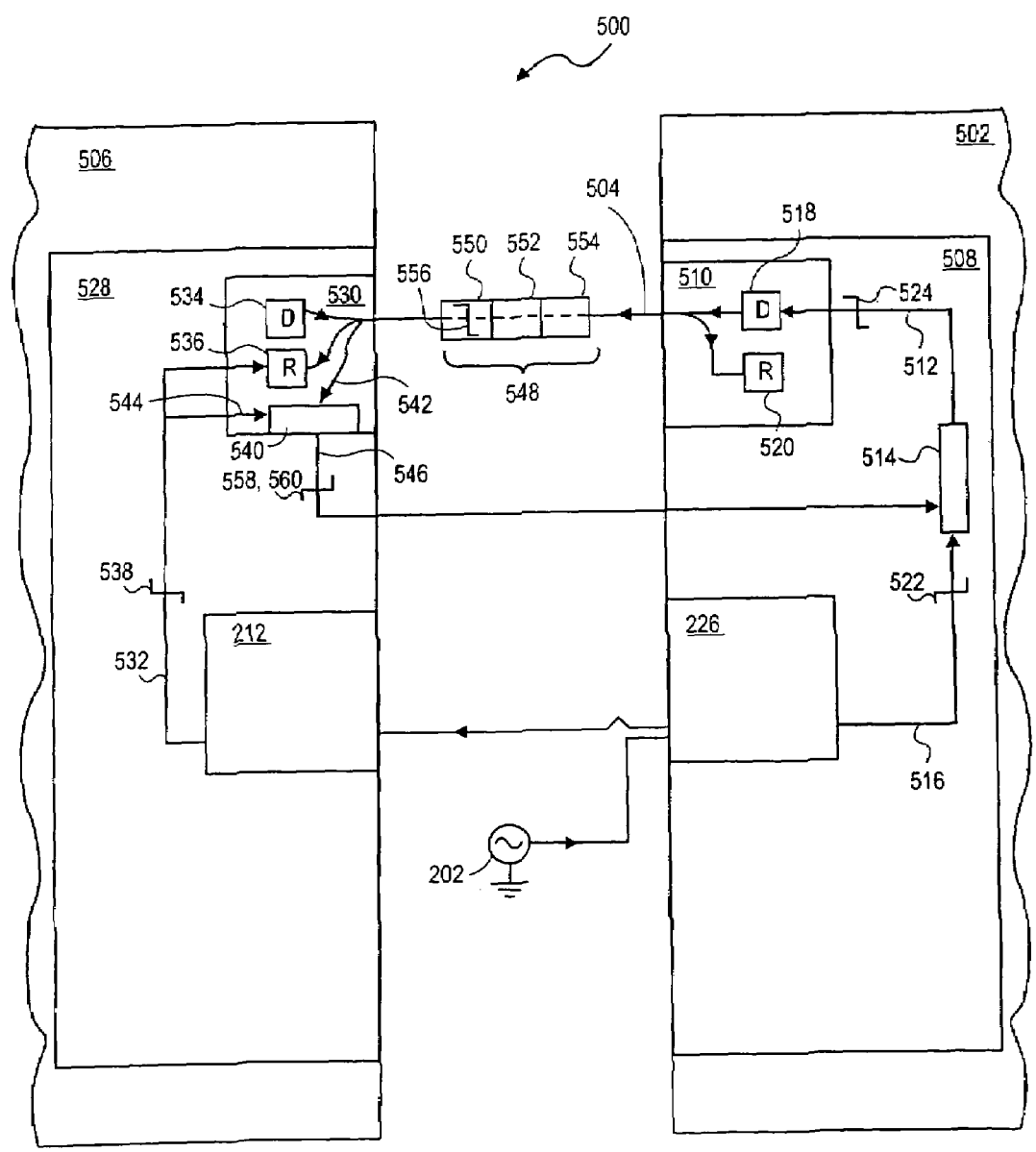
FIG. 5 illustrates platform 500 of the invention.

FIG. 5 illustrates platform 500 of the invention. The labels for the components of platform 500 may be modified by the adjective "transmit" or the adjective "receive." This may be to facilitate the detailed description of the invention rather than to limit the function of the component. Accordingly, each component of platform 500 may contribute to sending as well as receiving signals, such as clock signals or data signals.

Platform 500 of FIG. 5 may include transmit device 502, data bus 504, and receive device 506. Each of transmit device 502 and receive device 506 may serve as part of an input/output port for one chip, such as an integrated circuit chip. This chip may be an RDRAM, a channel repeater, a memory repeater (or transmit) hub, or a plurality of chips. Moreover, transmit device 502 and receive device 506 may be remote devices that serve as part of a system of input/output ports over a network, such as the Internet.

Data bus 504 may communicatively couple transmit device 502 to receive device 506. Data bus 504 may be a set of conductors, such as wires, copper cable, fiber optics, printed circuit tracks, or connections in an integrated circuit. Data bus 504 also may be that part of a network where there is no physical connection between a sender and a receiver. For example, data bus 504 may be part of a wireless device that connects the sender and receiver through radio or light waves.

Transmit device 502 may include transmit cell 508. As seen in FIG. 5, transmit cell 508 may include transmit data port 510, bus 512, variable delay device 514, and bus 516. Associated with transmit data port 510 may be driver ("D") 518 and receiver ("R") 520. Driver 518 may be coupled to data bus 504 so as to send data signals onto data bus 504.

Variable delay device 514 may receive raw clock signal 522 as an input from bus 516 and alter raw clock signal 522 to generate transmit cell clock signal 524. Raw clock signal 522 may be generated by a clock signal generator that may be either external or internal to transmit device 502. In one embodiment, raw clock signal 522 may be generated by clock signal generator 202.

Receive device 506 of FIG. 5 may include receive cell 528. As seen in FIG. 5, receive cell 528 may include receive data port 530 and bus 532. Associated with receive data port 530 may be driver ("D") 534 and receiver ("R") 536. Receiver 536 may be coupled to data bus 504 so as to receive data signals from data bus 504.

Bus 532 may permit transmission of raw clock signal 538. Raw clock signal 538 may represent a timing signal that synchronizes transmissions within receive device 506. Raw clock signal 538 may be generated by a clock signal generator that may be either external or internal to receive device 506. In one embodiment, raw clock signal 538 may be generated by clock signal generator 202.

Further associated with receive data port 530 may be detector 540. Detector 540 may be a device that receives two inputs, compares their offset from one another, and generate a signal in response to that offset. Detector 540 may include first input 542, second input 544, and output 546. First input 542 may be coupled to data bus 504 to receive data signals. Second input 544 may be coupled to bus 532 so as to receive raw clock signal 538 as a second input. Output 546 may be coupled to variable delay device 514 of transmit cell 508 so as to adjust the delay of variable delay device 514. This may permit clock signal 550 to align with raw clock signal 538 in quadrature. In one embodiment, detector 540 may be a quadrature phase detector (QPD).

Figure 6:
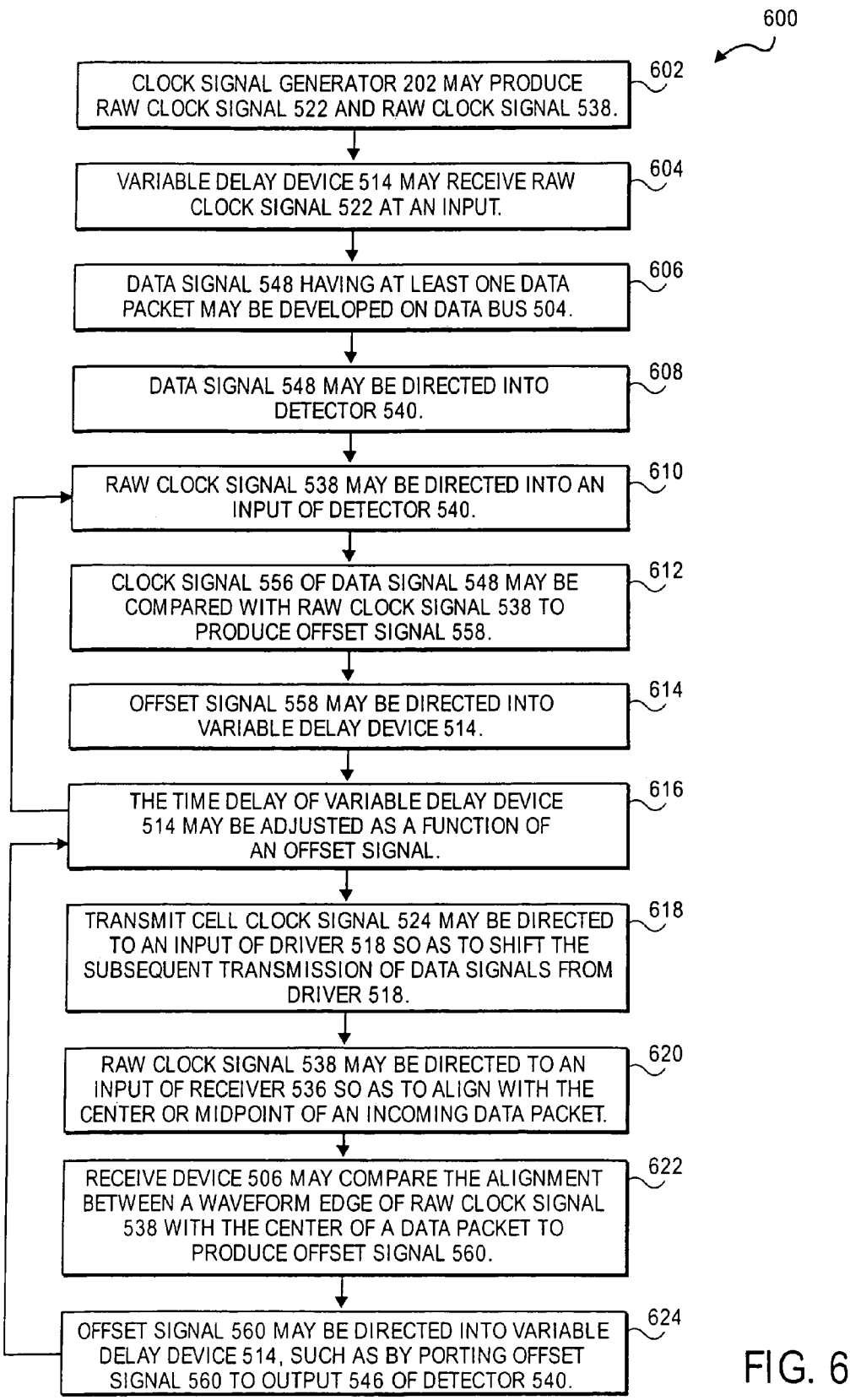
FIG. 6 illustrates method 600 of platform 500.

FIG. 6 illustrates method 600 of platform 500. At step 602, clock signal generator 202 may produce raw clock signal 522 and raw clock signal 538. Each raw clock signal may define a waveform having a plurality of edges. At step 604, variable delay device 514 may receive raw clock signal 522 at an input. At step 606, data signal 548 having at least one data packet may be developed on data bus 504. Data signal 548 may include data packets 550, 552, and 554. Each data packet may have a pre-established length, such as 1.25 nanoseconds (ns), where the length of each data packet may be the same, different, or a combination thereof.

The at least one data packet may define a clock signal. This clock signal may be disposed in a lead data packet, such as clock signal 556 disposed in data packet 550 of FIG. 5. Data pulses associated with the lead data packet initially may be in a data pattern so as to give a clock pulse appearance to these data pulses as carried on data bus 504. This data pattern may be a repeating data pattern. For example, the repeating data pattern may be 010101 . . . , 0011001100 . . . , etc.

At step 608, data signal 548 may be directed into detector 540. Data signal 548 also may be directed into receiver 536. At step 610, raw clock signal 538 may be directed into an input of detector 540. Raw clock signal 538 also may be directed into an input of receiver 536.

At step 612, clock signal 556 of data signal 548 may be compared with raw clock signal 538 to produce offset signal 558. Offset signal 558 may be a signal that represents the relationship between a waveform edge of raw clock signal 538 and a waveform edge of clock signal 556. This relationship may be a phase relationship.

At step 614, offset signal 558 may be directed into variable delay device 514. This may be over wire or wireless communications. At step 616, the time delay of variable delay device 514 may be adjusted as a function of an offset signal, such as offset signal 558. This may produce a modified transmit cell clock signal 524 which, in turn, may shift the transmission of subsequent data signal so that the center of each data packet of a transmitted data signal are more inline with the waveform edges of the raw clock signal 538. Where detector 540 indicates that the signal on bus 542 and bus 544 are in quadrature, the calibration process of method 600 may proceed to other steps. In quadrature, the time delay of variable delay device 514 may be maintained.

For example, offset signal 558 may indicate that the waveform edges of clock signal 556 lags the waveform edges of raw clock signal 538 at the input of receive data port 530. Accordingly, variable delay device 514 may increase the passage of raw clock signal 522 through variable delay device 514 to produce a modified transmit cell clock signal 524.

At step 618, transmit cell clock signal 524 may be directed to an input of driver 518 so as to shift the subsequent transmission of data signals from driver 518.

Method 600 may be performed once at initialization so as to ready transmit device 502 to transmit data signals to receive device 506. Moreover, method 600 may be performed as a sequential series one or more times during operation of transmit device 502 and receive device 506 as a feedback loop. Accordingly, method 600 may return from step 616 to step 610.

At step 620, raw clock signal 538 may be directed to an input of receiver 536 so as to align with the center or midpoint of an incoming data packet. Where a waveform edge of raw clock signal 538 aligns with the center of a data packet, the alignment may be said to be in quadrature whose phase is +/−90 degrees. Where an edge of raw clock signal 538 is placed at the midpoint of an incoming data pulse (such as that associated with data packet 538), both a setup margin and a hold margin may be maximized.

If a waveform edge of raw clock signal 538 is not aligned with the center of a data packet, this information may be used to generate an offset signal to adjust the delay of variable delay device 514. Accordingly, at step 622, receive device 506 may compare the alignment between a waveform edge of raw clock signal 538 with the center of a data packet to produce offset signal 560. Offset signal 560 may be thought of as an alignment offset signal. At step 624, offset signal 560 may be directed into variable delay device 514, such as by porting offset signal 560 to output 546 of detector 540. Method 600 then may return from step 624 to step 616. Here, method 600 may be performed as a sequential series one or more times.

Figure 7:
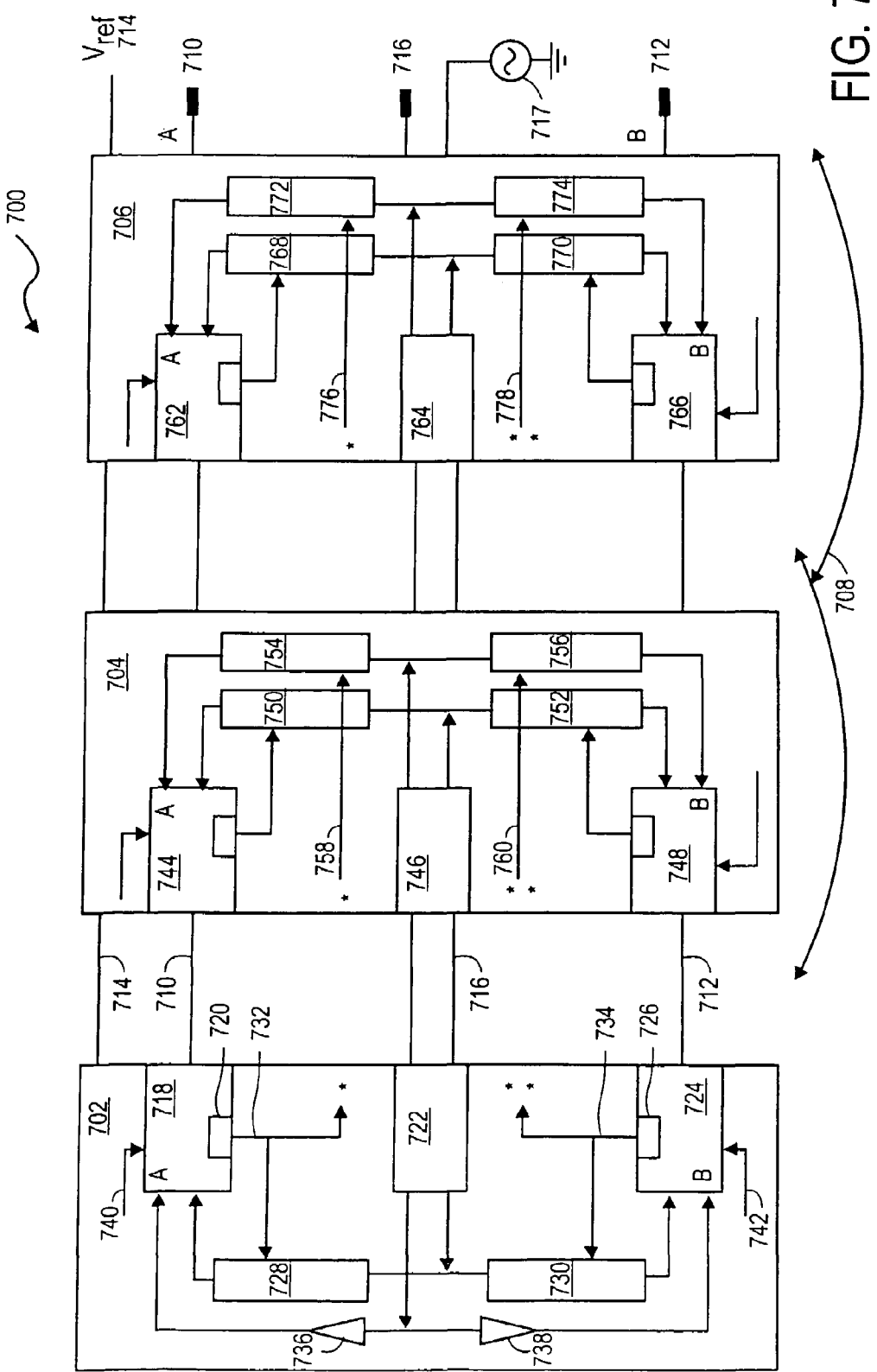
FIG. 7 illustrates platform 700 of the invention.

FIG. 7 illustrates platform 700 of the invention. Platform 700 may include master cell 702 and a plurality of slave cells. For example, platform 700 may include first slave cell 704 and second slave cell 706, each communicatively coupled to master cell 702 through channel 708. As interfaces, first cell 704 and second cell 706 may be thought of as slave cells since each may only write to and read from master cell 702 (point to point) whereas master cell 702 may write to and read from both first slave cell 704 and second slave cell 706, either individually (point to point) or at the same time (multi-point to point).

Each cell 702, 704, and 706 may be part of a device (not shown), such as an integrated circuit chip. In one embodiment, master cell 702 may be a library macrocell used in an ASIC design to interface the core logic of a Complementary Metal Oxide Semiconductor (CMOS) ASIC device to channel 708. Master cell 702 may function as a parallel-to-serial and serial-to-parallel converter that packs and unpacks high frequency data packets into wide, synchronous data words so as to permit high frequency (greater than 800 megahertz (MHz)) transfer rates. First slave cell 704 may be part of a first dynamic random access memory device 5(first DRAM) and second slave cell 706 may be part of a second DRAM device.

Channel 708 may include data buses (data bus A 710 and data bus B 712) as well as control buses (reverence voltage ($V_{ref}$) bus 714 and clock bus 716). In one embodiment, channel 708 may be a high-speed direct Rambus® channel capable of sustained data transfer rates at 1.25 ns per two bytes (10 ns per sixteen bytes). The buses of channel 708 may be a set of conductors, such as wires, copper cable, fiber optics, printed circuit tracks, or connections in an integrated circuit. One or more of these buses also may be that part of a network where there is no physical connection between a sender and a receiver. For example, at least one of data bus A 710 and data bus B 712 may be part of a wireless device that connects the sender and receiver through radio or light waves. The network may be at least one of a local area network (LAN), a metropolitan area network (MAN), a wide area network (WAN), or the Internet.

Master cell 702 of FIG. 7 may include master data port A 718 having detector A 720, master clock recovery device 722, and master data port B 724 having detector B 726. Master clock recovery device 722 may forward as an internal clock waveform (timing signal) a clock signal received from clock bus 716. The clock signal received from clock bus 716 may be generated by clock signal generator 717.

Master cell 702 may be capable of receiving as well as sending data signals. To receive data signals, master cell 702 may include one receive variable delay device for each data port. Here, master cell 702 may include receive variable delay device 728 disposed between master data port A 718 and master clock recovery device 722. Master cell 702 may also include receive variable delay device 730 disposed between master data port B 724 and master clock recovery device 722.

Master cell 702 may be prepared to receive data signals from at least one of first slave cell 704 and second slave cell 706 in a manner that may be similar to the discussion in connection with FIG. 3 and FIG. 4 in a one to one basis. Alternatively, master cell 702 may reach out to prepare at least one of first slave cell 704 and second slave cell 706 to send data signals to master cell 702 in a manner that may be similar to the discussion in connection with FIG. 5 and FIG. 6.

Similar to offset signal 558 of FIG. 5, offset signal A 732 may be based on a received data signal and subsequently may be distributed to a source of the data signal, such as at least one of first slave cell 704 and second slave cell 706. A distribution path for offset signal A 732 is illustrated in FIG. 7 by a "*" symbol. Offset signal B 734 similarly may be distributed within platform 700. Its distribution path is illustrated in FIG. 7 by a "**" symbol. Signals from the * distribution path may be distributed under the ** path as well.

As noted above, master cell 702 may be capable of receiving as well as sending data signals. To send data signals, master cell 702 may include one transmit variable delay device for each data port. However, in a multi-port data bus scheme, master cell 702 may send data signals to two or more slave cells. Shifting the midpoints of an outgoing data packets to align with the waveform edge of the internal clock of first slave cell 704 by employing the structure and method of FIG. 3 and FIG. 4 may not cause the midpoints of the outgoing data packets to align with the waveform edge of the internal clock of second slave cell 706 in a multi-point to point transfer. Thus, in transmitting data signals from master cell 702, it may be better to account for any offset by employing the structure and method of FIG. 5 and FIG. 6. Accordingly, master cell 702 may include clock buffer 736 and clock buffer 738 as shown. This scheme may allow master cell 702 to simultaneously calibrate the receiving clock of each slave cell by sending out a data patter to each slave cell at the same time.

Master cell 702 may also include detector control 740 and detector control 742, each of which may control the on/off status of its associated detector as well as the input/output of its associated detector.

Each of first slave cell 704 and second slave cell 706 may have similar components. First slave cell 704 may include slave data port A 744, slave clock recovery device 746, slave data port B 748, receive variable delay devices 750 and 752, as well as transmit variable delay devices 754 and 756. Transmit variable delay devices 754 and 756 may have inputs 758 and 760, respectively, to receive feedback offset signals from the data signal destination.

Second slave cell 706 may include slave data port A 762, slave clock recovery device 764, slave data port B 766, receive variable delay devices 768 and 770, as well as transmit variable delay devices 772 and 774. Transmit variable delay devices 772 and 774 may have inputs 776 and 778, respectively, to receive feedback offset signals from the data signal destination. Where timing skews associated with second slave cell 706 are not significant in multiple receiver situations (such as a byte), second slave cell 706 may share with first slave cell 704 transmit variable delay devices 754 and 756 so as to eliminate the need to employ transmit variable delay devices 772 and 774.

An advantage of the invention may be that each data signal receiving device may have the balanced and maximum setup and hold window, regardless of any timing skews introduced by the transmit device of the data signal or introduced by the bus over which that data signal may travel. The invention may lower the conventionally tight skew requirements so as to reduce design and layout constraints as well as achieve higher data communication yields. Accordingly, the invention may make higher frequency input/output bus transmissions possible with minimal modifications to existing input/output circuits.

The exemplary embodiments described herein are provided merely to illustrate the principles of the invention and should not be construed as limiting the scope of the subject matter of the terms of the claimed invention. The specification and drawings are, accordingly, to be regarded in an illustrative rather than a restrictive sense. Moreover, the principles of the invention may be applied to achieve the advantages described herein and to achieve other advantages or to satisfy other objectives, as well.

What is claimed is:

1. An apparatus comprising:
a variable delay device having an output, a first input, and a second input; and
a detector having a first input, a second input, and an output, the first input of the detector being coupled to the output of the variable delay device to receive a first clock signal, and the output of the detector being coupled to the second input of the variable delay device to cause the variable delay device to adjust the first clock signal to align an edge of the first clock signal with a center of a data packet, wherein the data packet is input to the second input of the detector.

2. The apparatus of claim 1, further comprising a clock generator coupled to the first input of the variable delay device to provide a second clock signal to the variable delay device, which generates the first clock signal from the second clock signal.

3. The apparatus of claim 1, wherein the variable delay device comprises a delay line.

4. An apparatus comprising:
a variable delay device having an output, a first input, and a second input; and
a detector having a first input, a second input, and an output, the first input of the detector being coupled to the output of the variable delay device to receive a first clock signal, and the output of the detector being coupled to the second input of the variable delay device to cause the variable delay device to adjust the first clock signal to align an edge of the first clock signal with a center of a data packet, wherein the detector comprises a quadrature phase detector.

5. A system comprising:
a plurality of dynamic random access memory (DRAM) devices;
a bus; and
a memory controller comprising:
a variable delay device having an output, a first input, and a second input; and
a detector having a first input, a second input, and an output, the first input of the detector being coupled to the output of the variable delay device to receive a first clock signal, and the output of the detector being coupled to the second input of the variable delay device to cause the variable delay device to adjust the first clock signal to align an edge of the first clock signal with a center of a data packet, wherein the data packet is input to the second input of the detector from one or more of the plurality of DRAM devices via the bus.

6. The system of claim 5, further comprising a clock generator coupled to the first input of the variable delay device to provide a second clock signal to the variable delay device, which generates the first clock signal from the second clock signal.

7. The system of claim 5, wherein the variable delay device comprises a delay line.

8. A system comprising:
a plurality of dynamic random access memory (DRAM) devices;
a bus; and
a memory controller comprising:
a variable delay device having an output, a first input, and a second input; and
a detector having a first input, a second input, and an output, the first input of the detector being coupled to the output of the variable delay device to receive a first clock signal, and the output of the detector being coupled to the second input of the variable delay device to cause the variable delay device to adjust the first clock signal to align an edge of the first clock signal with a center of a data packet, wherein the detector comprises a quadrature phase detector.

9. The system of claim 5, further comprising a processor coupled to the memory controller.

* * * * *